(12) United States Patent
Munoz et al.

(10) Patent No.: US 12,107,903 B2
(45) Date of Patent: Oct. 1, 2024

(54) SEAMLESS CONNECT

(71) Applicant: Mass Luminosity, Inc., Lake Dallas, TX (US)

(72) Inventors: Angel Munoz, Dallas, TX (US); Teodor Atroshenko, Sao Marcos (PT)

(73) Assignee: Mass Luminosity, Inc., Lake Dallas, TX (US)

( * ) Notice: Subject to any disclaimer, the term of this patent is extended or adjusted under 35 U.S.C. 154(b) by 0 days.

(21) Appl. No.: 17/501,412

(22) Filed: Oct. 14, 2021

(65) Prior Publication Data

US 2023/0121137 A1 Apr. 20, 2023

(51) Int. Cl.
*H04L 65/1069* (2022.01)
*H04L 12/18* (2006.01)
*H04L 65/403* (2022.01)

(52) U.S. Cl.
CPC ...... *H04L 65/1069* (2013.01); *H04L 12/1822* (2013.01); *H04L 65/403* (2013.01)

(58) Field of Classification Search
CPC ............. H04L 65/1069; H04L 12/1822; H04L 65/403; H04M 3/562
See application file for complete search history.

(56) References Cited

U.S. PATENT DOCUMENTS

| | | | | |
|---|---|---|---|---|
| 8,483,375 | B2 * | 7/2013 | Dhara | H04L 65/403 709/204 |
| 8,695,077 | B1 * | 4/2014 | Gerhard | H04L 63/0815 726/8 |
| 8,819,129 | B1 * | 8/2014 | Cyriac | H04L 65/403 709/224 |
| 10,616,278 | B1 * | 4/2020 | Johansson | H04L 65/403 |
| 10,623,575 | B1 * | 4/2020 | Synal | H04L 12/1818 |
| 10,628,800 | B2 * | 4/2020 | Moran | G06Q 10/1095 |
| 10,630,843 | B1 * | 4/2020 | Rosenberg | H04L 65/403 |
| 10,771,624 | B1 * | 9/2020 | Penar | H04L 63/08 |
| 2008/0222533 | A1 * | 9/2008 | Hankejh | G06Q 30/02 715/738 |
| 2011/0228922 | A1 * | 9/2011 | Dhara | H04L 12/1818 379/202.01 |
| 2012/0243673 | A1 * | 9/2012 | Carr | H04L 12/1818 379/202.01 |
| 2012/0244836 | A1 * | 9/2012 | Colbert | H04L 65/1069 455/411 |

(Continued)

OTHER PUBLICATIONS

R. Falk, S. Fries and H. J. Hof, "Protecting Voice over IP Communication Using Electronic Identity Cards," 2010 Third International Conference on Advances in Human-Oriented and Personalized Mechanisms, Technologies and Services, Nice, France, 2010, pp. 5-10, doi: 10.1109/CENTRIC.2010.12. (Year: 2010).*

(Continued)

*Primary Examiner* — Patrice L Winder
(74) *Attorney, Agent, or Firm* — Lathrop GPM LLP

(57) ABSTRACT

A method implements seamless connection. The method includes receiving a message for a join call request for a client device. The message includes a participant identifier. The method further includes verifying the participant identifier, identifying a call corresponding to the participant identifier, and establishing a connection between the client device and the call.

20 Claims, 6 Drawing Sheets

(56) References Cited

U.S. PATENT DOCUMENTS

| | | | |
|---|---|---|---|
| 2013/0179941 A1* | 7/2013 | McGloin | H04L 12/1822 726/3 |
| 2015/0029302 A1* | 1/2015 | Hendrickson | H04N 7/15 348/14.08 |
| 2018/0012191 A1* | 1/2018 | Rosenberg | H04L 65/403 |
| 2020/0252503 A1* | 8/2020 | Li | H04L 65/1069 |
| 2020/0382511 A1* | 12/2020 | Friel | H04L 65/1093 |

OTHER PUBLICATIONS

C. Wendt et al., RC 8588: Personal Assertion Token (PaSSporT) Extension for Signaturebased Handling of Asserted information using toKENS (SHAKEN), An IP.com Prior Art Database Technical Disclosure, IP.com No. IPCOM000258483D, Electronic Pub May 15, 2020, 10 pages. (Year: 2020).*

Author unkown, Method and System to Allow Participants to Seamlessly Switch to Another Web Conference, Prior Art Database Technical Disclosure, IP.com No. IPCOM000266467D, IP.com, Jul. 2021, 6 pages. (Year: 2021).*

* cited by examiner

SEAMLESS CONNECT

BACKGROUND

Users of video conferencing services may access email, calendars, conferencing service applications, or websites to obtain the web link, dial-in phone numbers, PIN (personal identification number) codes, or unique conference call identifiers to use for joining a conference call. In some situations, the user may not have access to the device with access to email or calendar, while having access to a phone that can be used to dial into the call. The user may then contact other call participants and ask them for the information used to join the call, leading to delays in joining the call and degraded user experience for both the user and other call participants. A challenge is to provide conferencing services that allow a user to seamlessly connect to calls and conferences.

SUMMARY

In general, in one or more aspects, the disclosure relates to a method that implements seamless connection. The method includes receiving a message for a join call request for a client device. The message includes a participant identifier. The method further includes verifying the participant identifier, identifying a call corresponding to the participant identifier, and establishing a connection between the client device and the call.

In general, in one or more aspects, the disclosure relates to a system. The system includes a verification controller configured to verify a participant identifier and an identification controller configured to identify a call. The system further includes a server application executing on one or more servers. The server application is configured for receiving a message for a join call request for a client device. The message includes the participant identifier. The server application is further configured for verifying, with the verification controller, the participant identifier; identifying, with the identification controller, the call corresponding to the participant identifier; and establishing a connection between the client device and the call.

In general, in one or more aspects, the disclosure relates to a method of a client device. The method includes interacting, by a client application, with a server application to join a call. The server is configured for receiving a message for a join call request for a client device hosting the client application, verifying a participant identifier of the message, and identifying a call corresponding to the participant identifier. The method further includes establishing a connection to the call.

Other aspects of the disclosure will be apparent from the following description and the appended claims.

DETAILED DESCRIPTION

Figure 1:
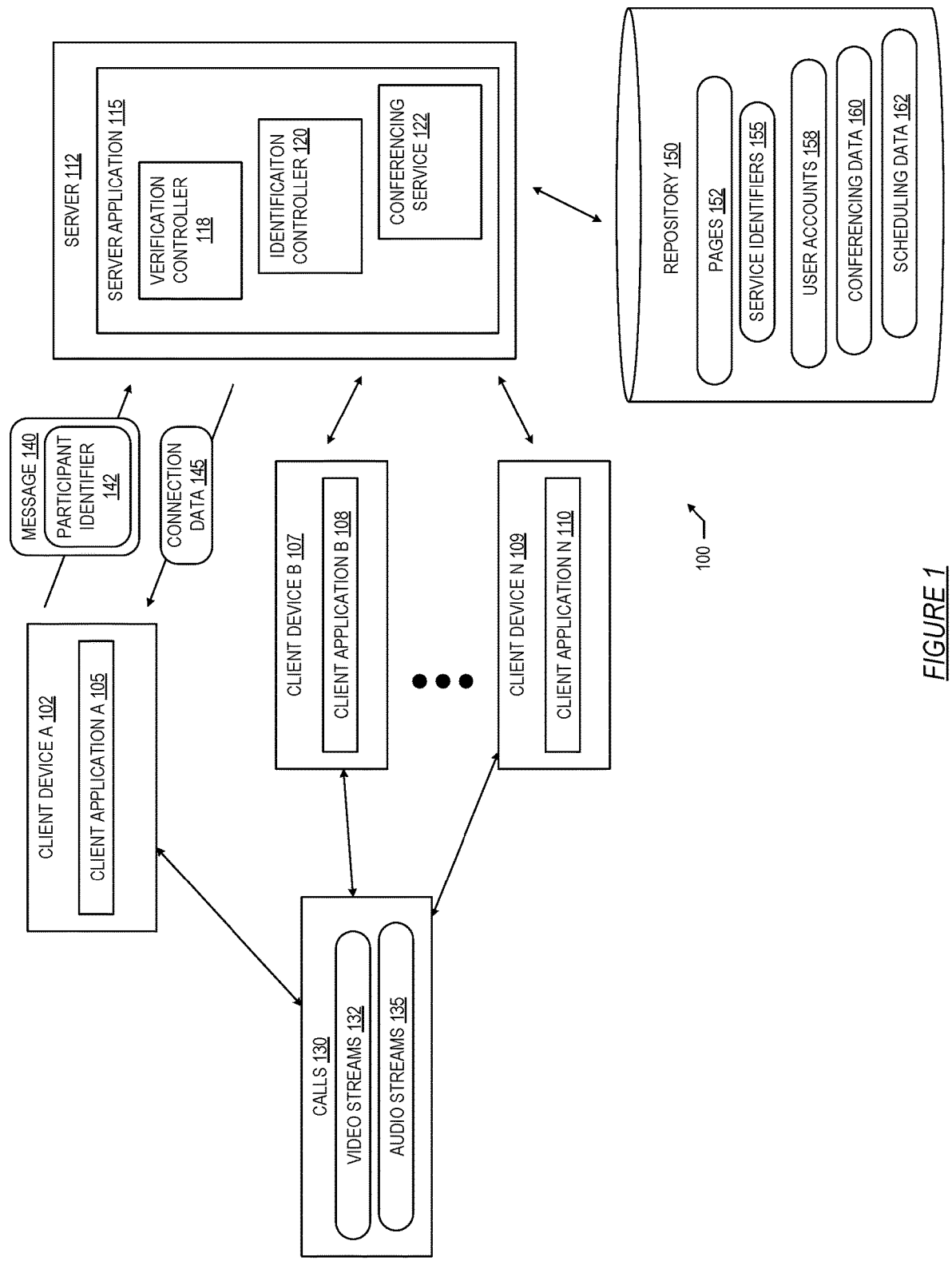
FIG. 1 shows a diagram of a systems in accordance with disclosed embodiments.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, although the description includes a discussion of various embodiments of the disclosure, the various disclosed embodiments may be combined in virtually any manner. All combinations are contemplated herein.

In general, embodiments of the disclosure provide for seamlessly connecting user to calls (also referred to as conferences, conference calls, etc.) without having to provide additional information (e.g., call specific passwords). The system may automatically and seamlessly connect a user to a call in about five seconds.

The conference service may provide that multiple users may connect to different calls by accessing the same service identifier (web links, telephone numbers, etc.). For example, two users may dial the same number (or access the same web link) and be securely connected to two different calls. To connect different users to the appropriate calls, the conference service verifies the users from participant identifiers, identifies calls that are appropriate for the verified users, and may then connect users to the appropriate calls.

In some situations, the user may dial-in to a conferencing call from a smartphone while performing another task. For example, the user may be driving and using handsfree functionality to dial a number. Instead of the user being asked to introduce a PIN code to join a call, the system may automatically verify the user, identify a call, and connect the user to the call. The seamless connection is helpful when the user is not be able to reach the smartphone to enter the PIN code digits. In another example, the user may not remember the digits to enter. Instead of the user attempting to read a call invitation email or calendar entry to obtain the PIN code digits, the system seamlessly connects the user. Seamlessly connecting the user prevents the user from attempting to read the information that may lead to further distraction while performing other tasks. For example, the user may be driving a car and seamless connecting allows the user to connect without attempting to operate the vehicle and search for information in a phone or computer while driving. Seamlessly connecting the user prevents the user from being triggered to engage in unsafe behavior while trying to obtain and enter the PIN code to join a call, which also leads to user frustration and dissatisfaction. Embodiments of the disclosure address these issues by providing a single service identifier (in this case a phone number) that, when dialed, seamlessly connects the user to the call without the user having to look up additional connection information.

In other situations, a web link may be used. Instead of a web link from an email, a calendar entry, a conferencing service application, etc., which may no longer function, the user may access a single web link for the conference provider. The web link for the conference provider will not be revoked by the call host and replaced with a new link.

In another example, using a single link may remove the issue of a conference call password being updated without updating existing sources (e.g., emails) for the password that contain the old password. In another example, using a single link removes the issue of a link being updated in response to adding or removing users to a call. Using a single link prevents users from accessing outdated links and being shown a page not found error on the screen or an access denied screen in the web application, which leads to user frustration. Using a single link prevents the user from having to contact other call participants to obtain the working web link, which leads to delays in joining the call and degraded user experience for both user and other call participants. Embodiments of the disclosure may address these issues by providing a single service identifier (in this case a web link) that, when selected, seamlessly connects the user to the call without the user having to look up additional connection information.

In certain implementations, the user may join a conference call by opening a web link from their electronic device (e.g., smartphone, laptop, desktop, tablet, in-car browser, etc.) or by dialing a phone number from their number (e.g., mobile number, landline, VOIP number, personal office line, etc.). The conferencing service may authenticate the user (e.g., based on call headers, based on HTTP (hypertext transfer protocol) request headers, etc.) and seamlessly connect the user to an appropriate call (e.g., scheduled call that user is hosting, user's personal conference room, call with connected participants that the user accepted an invitation for, etc.).

In some implementations, the user may open a web link in a web browser on their electronic device. The user may open the same web link when trying to join different calls. For example, the user may use a web link to join a scheduled call on Monday and the user may use the same web link to join another call on Tuesday. A different user may use the same web link when joining a call. The user may store the web link in web browser's bookmarks, or the user may memorize the link (e.g., short link, memorable link using appropriate dictionary words, etc.). In some implementations, the conferencing service may publish the web link on a web site and the user may navigate to the web link from the web site. For example, the user may open the home page of conferencing service, the user may see the "Enter call" button presented on the home page, the user may interact with the button (e.g., tap, click), the web browser may navigate the page to the web link used for joining calls.

In some implementations, the user may dial a phone number. The user may dial the same phone number when trying to join different calls. For example, the user may dial a phone number to connect to their personal conference room that may have connected participants on Wednesday, and the user may use the same phone number to join a scheduled call next Tuesday. A different user may also use the same phone number to join a call. The user may store the phone number in contacts, or the user may memorize the phone number. In some implementations, the conferencing service may publish the phone number on a web site and the user may discover the phone number by visiting a web site. For example, the user may open the home page of conferencing service, the user may see the phone number (e.g., next to the label "universal dial-in number"), the user may proceed to dial the phone number to join a call.

In some implementation, the user opening a web link may produce an HTTP request received by the conferencing service server. The request may contain user IP address and authentication headers (e.g., cookies, authentication, X-Auth, etc.). In some implementations, the web browser may produce the request and the web browser additionally include authentication headers. For example, the user may be logged in to the conferencing service web site, the authentication information may be stored in cookie information, the web browser may include header cookies in some HTTP requests sent to the web site, and the server may use header cookies to perform authentication while handling the request. In another example, the web server may use a user IP address contained in the request to perform authentication, the server may query persistent storage for user identities associated with the IP address, and, if a match is found, the server may associate one or more user identities with the request. In some implementations, the authentication header may contain a signed user identifier (e.g., a JWT). For example, the server may receive a request with an authentication header set to JWT containing a signed unique user identifier, the server may associate user identifier with the request without querying persistent storage, and the server may use user identifier associated with the request in place of user identity associated with the request.

In some implementations, the user dialing a phone number may produce a message that may be received by the conferencing service server. The message may contain dialing phone number (e.g., Caller ID) and call origin verification information (e.g., STIR/SHAKEN headers). For example, the user may dial a phone number from a smartphone, the telephony provider may perform internal authentication to verify the identity of the calling device (e.g., ensure that dialing phone number is not spoofed), the telephony provider may add headers that are signed by telephony provider's private key, the receiver of the message may use provider's public key to ensure the dialing phone number is authentic. In another example, the first message with authenticated dialing phone number may be received by the VoIP provider, the VoIP provider may produce a second message containing some of the information contained in the first message, the VoIP provider may include a field with results (e.g., Boolean true or false) of dialing phone number verification, the second message may be received by the conferencing service server. In some implementations, the conferencing service server may use information contained in the message to obtain verified dialing number, the server may query persistent storage for user identities associated with a dialing number, if a match is found, the server may associate one or more user identities with the message.

The user may use the conferencing service user interface (e.g., web site, mobile application, desktop application, etc.) to associate one or more dialing numbers with the user identity. For example, the user may use settings section of the web site to associate a dialing number (e.g., mobile phone number, landline phone number, VoIP phone number, etc.) with the user identity (e.g., user account, business account, user profile, etc.), the conferencing service server may store the association in persistent storage, the server may require additional verification before associating the dialing number with user identity (e.g., enter code from text message sent to dialing number, answer incoming voice call to dialing phone number and dial one or more digits, etc.), the user may use the web site to remove association between a dialing number and the user identity. In some implementations, the user may associate other sufficiently unique (e.g., shared by less than 10 users) identifiers (e.g., private IP address, MAC address) with the user identity.

In some implementations, the conferencing service server may use one or more user identities associated with the HTTP request or with the message to produce a list of candidate calls (e.g., scheduled call that user is hosting, user's personal conference room, call with connected participants that the user accepted an invitation for, etc.). The server may query persistent storage for calls associated with each one of user identities associated with the request or the message. For example, the server may perform a database query for calls where at least one confirmed participant's user identity matches the user identity associated with the request or the message, the server may filter the results to exclude calls that are too far into the past (e.g., ended more than 30 minutes ago) or too far into the future (e.g., scheduled to start in more than 30 minutes), the server may sort the list in ascending order of call start time. In another example, the server may include the scheduled calls that may be too far into the future (e.g., scheduled to start in more than 30 minutes) in the list of candidate calls if there is one or more participants already connected to the call.

In some implementations, the conferencing service server may add rooms where the user is a participant to the list of matching calls. The server may query persistent storage for the list of rooms where the user (e.g., identified by user identity) is a participant. The server may filter the list of rooms to exclude the rooms where there are no connected participants or where there was no recent activity (e.g., last participant connected to the room more than 7 days ago).

In some implementations, the conferencing service server may add personal conference room to the list of matching calls. The user may be assigned a personal conference room by the conferencing server. The room may be permanently assigned to the user, and the user may be the room host. For example, the first user may dial a number to join a call, the second user may have used a unique web link to join the personal conference room of the first user, the second user may be waiting in the room for the first user to join, the server may process the message, the server may prepare the list of candidate calls containing one item (e.g., personal conference room), the server may connect the first user device to the conference room, the first user and the second user may be able to hear each other and talk to each other. In some implementations, the user may toggle (e.g., enable or disable) the ability to join their personal conference room by using the web link or by dialing the phone number. For example, the user may use the conferencing service user interface to check the checkbox that may correspond to enabling access to the personal conference room by using the web link or by dialing the phone number, the server may persistently save the user preference, the server may include the personal conference room in the list of candidate calls when processing the HTTP request or the message with associated user identity of the user.

In some implementations, the conferencing service server may select one call (e.g., matching call) from the list of candidate calls and it may associate it with the HTTP request or the message. The server may select the call with earliest starting time, if the starting time is set for the call. For example, the list of candidate calls may contain two calls, the first call may start at 9 am and end at 10 am, the second call may start at 8:30 am and end at 9:30 am, the server may select the second call to be the matching call. In some implementations, the server may give preference to calls with more connected participants. For example, the list of candidate calls may contain two calls, the first call may have zero connected participants and start at 1 pm, the second call may have four connected participants and start at 1:30 pm, the server may select the second call to be the matching call. In some implementations, the server may give preference to calls managed (e.g., the user is call host, the user created the call) by the user. For example, the list of candidate calls may contain two calls, the first call may be managed by the user, the first call may start at 11 am, the second call may be managed by the second user, the second call may start at 10:30 am, the server may select the first call to be the matching call.

In some implementations, the list of candidate calls may be empty (e.g., no matches found). The conferencing service server may return an error response to the HTTP request or the message. For example, the user may dial the phone number, the server may find no matching calls, the server may produce an audio response that the user may hear on their device, the response may indicate that no matching calls were found.

In some implementations, the conferencing service server may return an error response when the HTTP request or the message have no associated user identities. In other implementations, the server may respond with an offer to the user to perform authentication using an alternative method available to the user. For example, the user may open a web link, the server may fail to associate any user identity to the HTTP request, the server may return an error page with login form to the user, the user may then proceed to enter login information to perform authentication, the user may then repeat the HTTP request.

In some implementations, the conferencing service server may respond to the HTTP request with matching call by redirecting (e.g., location header, HTTP redirect, JavaScript redirect, etc.) to call join link. For example, the user may open a web link, the server may associate user identity, produce list of candidate calls, select matching call, the server may process call information and produce the call join link (e.g., unique participant link, public call join link, etc.), the server may produce an HTTP response with location header set to the call join link, the web browser on the user device may navigate the call join link, and the user may join the conference call.

In some implementations, the conferencing service server may respond to the message with matching call with information needed to seamlessly connect to the conference call. In other implementations, the server may establish an audio connection between the dialing device and the conference call. For example, the user may dial a phone number, the server may associate user identity, produce list of candidate calls, select matching call, the server may process call information and produce SIP credentials (e.g., username and password) needed to connect to the conference call with audio, the user device may establish connection to the conference call, and the user may begin to hear the call audio and the user may be able to speak to call participants through their device.

FIG. 1 shows a diagram of the system (100) for seamlessly connecting users to calls. Embodiments of FIG. 1 may be combined and may include or be included within the features and embodiments described in the other figures of the application. The features and elements of FIG. 1 are, individually and as a combination, improvements to conference call technology and computing systems.

The various elements, systems, and components shown in FIG. 1 may be omitted, repeated, combined, and/or altered as shown from FIG. 1. Accordingly, the scope of the present disclosure should not be considered limited to the specific arrangements shown in FIG. 1.

Turning to FIG. 1, the system (100) seamlessly connects the users of the client devices A (102), B (107), through N (109) to the calls (130). The system includes the client devices A (102) through N (109), the server (112), and the repository (150).

Figure 6A:
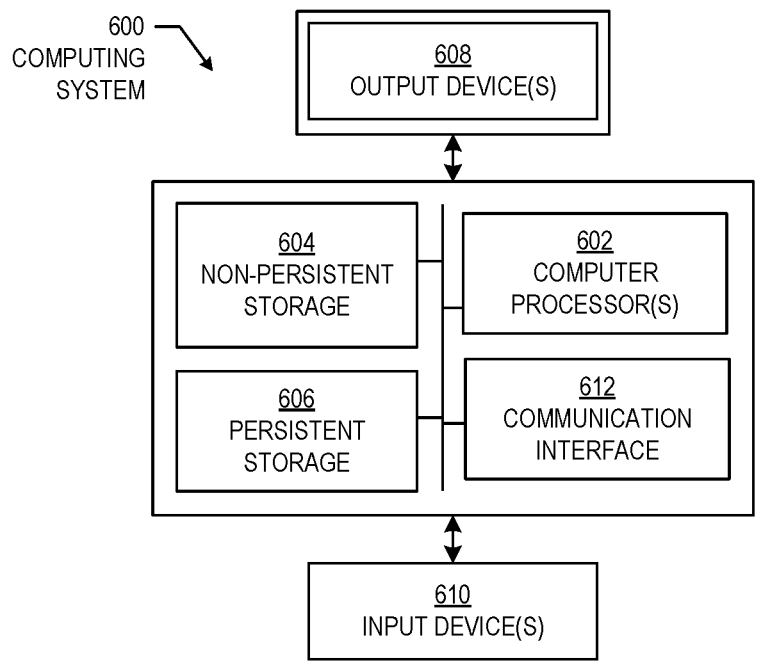
FIG. 6A and FIG. 6B show computing systems in accordance with disclosed embodiments.

The client devices A (102) and B (107) through N (109) are computing systems (further described in FIG. 6A). For example, the client devices A (102) and B (107) through N (109) may be desktop computers, mobile devices, laptop computers, tablet computers, etc. The client devices A (102) and B (107) through N (109) include hardware components and software components that operate as part of the system (100). The client devices A (102) and B (107) through N (109) communicate with the server (112) to connect to the calls (130). The client devices A (102) and B (107) through N (109) may communicate with the server (112) using standard protocols and file types, which may include hypertext transfer protocol (HTTP), HTTP secure (HTTPS), transmission control protocol (TCP), internet protocol (IP), hypertext markup language (HTML), extensible markup language (XML), etc. The client devices A (102) and B (107) through N (109) respectively include the client applications A (105) and B (108) through N (110).

The client applications A (105) and B (108) through N (110) may each include multiple programs respectively running on the client devices A (102) and B (107) through N (109). The client applications A (105) and B (108) through N (110) may be native applications, web applications, embedded applications, telephone applications, etc. In one embodiment the client applications A (105) and B (108) through N (110) include web browser programs that display web pages from the server (112).

The message (140) is a communication received by the server (112) in response to the client device A (102) attempting to connect to one of the calls (130). The message may be an HTTP packet, an incoming public switched telephone network (PSTN) call, an incoming voice over internet protocol (VOIP) call, etc. The message (140) includes the participant identifier (142).

The participant identifier (142) identifies the user of the client device A (102). The participant identifier (142) may be a cookie in a header of an HTTP packet, an internet protocol (IP) address of the client device (102), a JavaScript object notation (JSON) web token (JWT), a telephone number of the client device A (102), caller identification (Caller ID) data, Secure Telephony Identity Revisited (STIR) data, Signature-based Handling of Asserted information using toKENs (SHAKEN) data, etc. For example, when the client device A (102) attempts to connect by opening a web link, the participant identifier (142) may include cookies, tokens, header data, etc. When the client device A (102) attempts to connect by placing a VOIP call, the participant identifier (142) may include an IP address and STIR data. When the client device A (102) attempts to connect by placing a PSTN call, the participant identifier may include caller ID data and SHAKEN data.

The connection data (145) is data used by the client device A (102) to connect to one of the calls (130). The connection data (145) is generated by the server (112) in response to the message (140) after verification of the user and identification of the one of the calls. The connection data (145) may include locations and instructions for connecting to one of the calls (130). For example, the connection data (145) may include a uniform resource locator (URL) for one of the calls (130) that, when accessed, connects the client device A (102) to the call. As another example, the connection data (145) may include set of instructions and application programming interface (API) calls that when executed by the client device A (102) (or a service provider (e.g., a phone company) through which the client device A (102) connects to the system) connects the client device A (102) to one of the calls (130).

The type of the connection data (145) that is generated may be determined by the server (112) based on the type of the message (140). For example, an HTTP request may include a URL in the connection data (145) and a message from a telephone service provider may include instructions for the telephone service provider for connecting to a call in the connection data (145).

In one embodiment, the different client devices A (102) and B (107) through N (109) may connect to the same call, of the calls (130), using different types of communication protocols. For example, the client device A (102) may initiate a browser-based connection by clicking a link on a web page, the client device B (107) may initiate a connection by placing a PSTN call to the conference provider (operating the server (112)), and the client device N (109) may initiate a connection by placing a VOIP call to the conference provider, etc.

The calls (130) (also referred to as conference calls, conference rooms, video calls, video conferences, audio conferences, etc.) are active calls between the client devices A (102), B (107), through N (109). Each call, of the calls (130), is connected to by one or more of the client devices A (102), B (107), through N (109). The calls (130) may be set up as peer-to-peer calls (directly between the clients without using a central server). In one embodiment, a call of the calls (130) may be hosted using a server to which the client devices A (102) through N (109) connect. Each call includes one or more of the video streams (132) and the audio streams (135).

The video streams (132) and the audio streams (135) are captured by and distributed among the client devices A (102) through N (109). Multiple audio and video streaming protocols may be used. Individual ones of the video streams (132) and the audio streams (135) may be combined into a single stream that is delivered to the client devices A (102) through N (109).

The server (112) is a computing system (further described in FIG. 6A). The server (112) may include multiple physical and virtual computing systems that form part of a cloud computing environment. In one embodiment, execution of the programs and applications of the server (112) is distributed to multiple physical and virtual computing systems in the cloud computing environment. The server (112) includes the server application (115).

The server application (115) is a collection of programs that may execute on multiple servers of a cloud environment, including the server (112). In one embodiment, the server application (115) hosts websites and conferencing services used by the client devices A (102) through N (109) to allow the users of the client devices A (102) through N (109) to communicate. The server application (115) includes the verification controller (118), the identification controller (120), and the conferencing service (122).

The verification controller (118) is a set of hardware and software components of the server application (115). The verification controller (118) verifies users of the system (100) in response to the messages (including the message (140)) received from the client devices A (102) through N (109). In one embodiment, the verification controller (118)

matches participant identifies from the messages to corresponding data in the user accounts (158) from the repository (150).

The identification controller (120) is a set of hardware and software components of the server application (115). The identification controller (120) identifies calls (also referred to as candidate calls) for users connecting to the system (100). The candidate calls may be identified by temporal metadata (including the start date and time of the call relative to the current date and time), the number of other users presently on a call, etc.

The conferencing service (122) is a set of hardware and software components of the server application (115). The conferencing service (122) provides the connection data (including the connection data (145)) for the calls (130) and may host calls that use a server.

The repository (150) is a computing system that may include multiple computing devices in accordance with the computing system (600) and the nodes (622) and (624) described below in FIGS. 6A and 6B. The repository (150) may be hosted by a cloud services provider that also hosts the server (112). The cloud services provider may provide hosting, virtualization, and data storage services as well as other cloud services and to operate and control the data, programs, and applications that store and retrieve data from the repository (150). The data in the repository (150) includes the pages (152), the service identifiers (155), the user accounts (158), the conferencing data (160), and the scheduling data (162).

The pages (152) are web pages that may be hosted by the server (112) and accessed by the client devices A (102) through N (109). The pages (152) include the service identifiers (155).

The service identifiers (155) are data values used to connect to the system (100). For example, a service identifier may be a public URL that, when accessed by one of the client devices A (102) through N (109), triggers the process of verifying a user, identifying one of the calls (130) for the user, and transmitting connection information to the user so that the user may connect to the call. In one embodiment, a service identifier may be a phone number, which may be displayed within one of the pages (152).

The user accounts (158) are collections of data that identify the user, the devices of the user, and the information that may be used to verify a user. For example, a user account may include personally identifying information about the user (name, address, phone number, etc.) and information about the devices (e.g., the client device A (102)) that a user may operate. The information about the devices may include IP addresses, machine address code (MAC) addresses, component model and serial numbers, etc., that may be used to identify and verify individual ones of the client devices A (102) through N (109).

The conferencing data (160) is a collection of data with information about the calls (130) that may be maintained while the individual calls are presently active. The conferencing data (160) may include the contact information (e.g., a URL) for connecting to a call, the number users on a call, temporal metadata (start time, end time, call duration, etc.), etc. The conferencing data (160) may also include the scheduling data (162).

The scheduling data (162) is a collection of data with information about the calls scheduled with the system that are either active or not active. The scheduling data (162) includes temporal information and participant information. The temporal information includes start and end times and dates for calls scheduled with the system. The participant information identifies the participants for the calls with participant identifiers, which may link to the user accounts (158).

Figure 2:
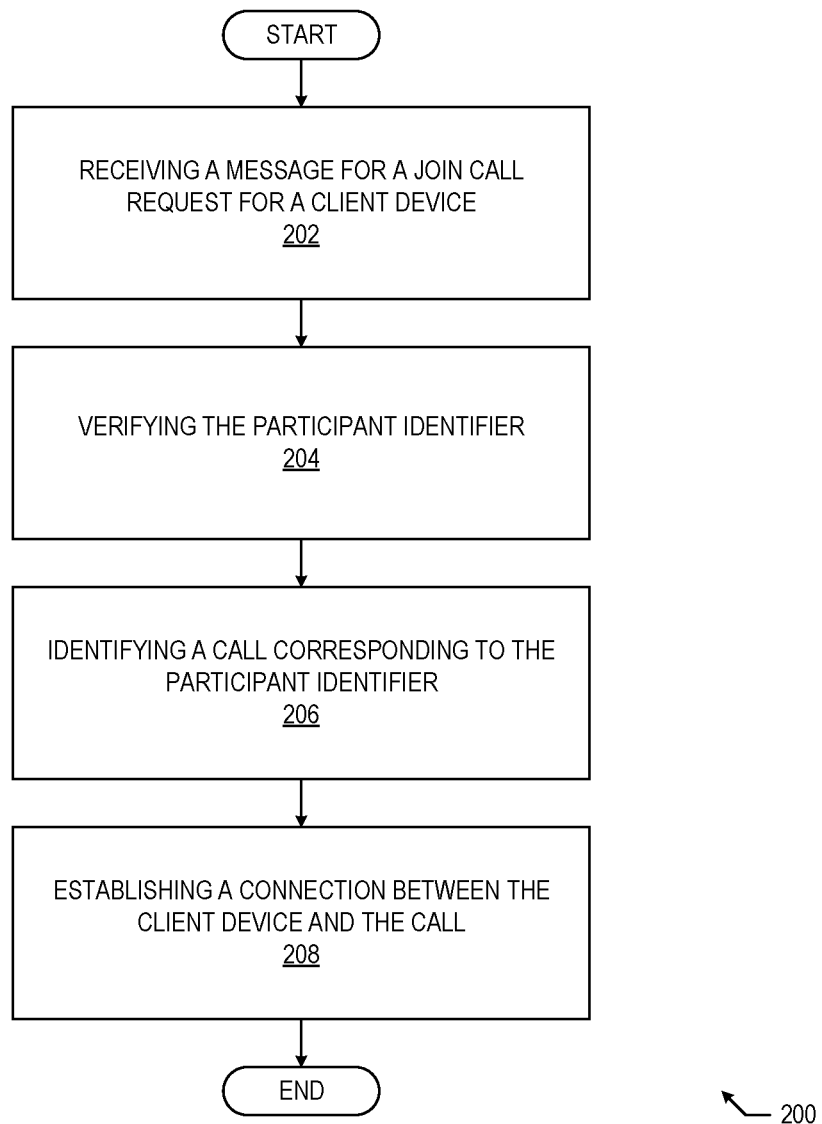
FIG. 2 shows a flowchart in accordance with disclosed embodiments.

FIG. 2 shows a flowchart of a process in accordance with the disclosure. FIG. 2 illustrates the process (200) to seamlessly connect users to calls. The embodiments of FIG. 2 may be combined and may include or be included within the features and embodiments described in the other figures of the application. The features of FIG. 2 are, individually and as an ordered combination, improvements to conference call technology and computing systems. While the various steps in the flowcharts are presented and described sequentially, one of ordinary skill will appreciate that at least some of the steps may be executed in different orders, may be combined or omitted, and at least some of the steps may be executed in parallel. Furthermore, the steps may be performed actively or passively.

At 202, a message is received for a join call request for a client device. The message includes a participant identifier. The message may be received from different types of service providers, including PSTN service providers, VOIP providers, mobile communications providers, internet service providers, etc. The message may include the participant identifier in caller ID information, STIR/SHAKEN information, IP address information, MAC address information, cookie information, token information, etc.

In one embodiment, the message is received in response to selection of a service identifier by a client device (also referred to as a participant device) of a user. The service identifier may be used (i.e., selected) by multiple users for connecting to multiple different calls. For example, the service identifier may be a public phone number of a conference provider. Multiple different users may dial the same public phone number to get connected to different conference calls. In one embodiment, the service identifier is a public web link selected by the user. For example, the public web link may be a single URL that multiple different users select, with corresponding browsers, to connect to multiple different calls managed by a conference provider.

At 204, the participant identifier is verified. In one embodiment, the system may verify the participant identifier by searching for a user account with information that matches the participant identifier.

In one embodiment, a user identifier is stored to a user account and is used to verify the participant identifier. The user identifier may include a token, an IP address, a username, caller ID information (e.g., a telephone number), etc. The user may be verified by matching or validating the participant identifier. In one embodiment, the participant identifier, from the message, is verified by matching the participant identifier to the user identifier, which is stored to the user account. In one embodiment, the participant identifier is a token that is verified by validating the participant identifier by checking the signature of the participant identifier.

In one embodiment, the verification may fail. After failure of the verification, the system may send an alternative verification message to the device of the user. For example, the alternative verification message may be part of a web page asking the user to log into the system with a username and password. The message (from (202)) may be a message received after the alternative verification message is sent to the client device.

At 206, a call is identified that corresponds to the participant identifier. In one embodiment, the system maintains a database with call information that identifies the participants, start times, end times, etc., of the calls of the conference provider to which users may connect. The database of call information may be searched and filtered to identify the list of candidate calls to which a user may be attempting to connect.

In one embodiment, the call is identified by filtering calls to form a list of candidate calls. The filtering may use one or more of the participant identifier, a temporal range, and a plurality of call activities of the plurality of calls.

Filtering by the participant identifier may identify candidate calls in which the user is identified as a participant of the call. The user may be identified as a participant by the data for the call including a list of participant identifiers that are checked by the system against the participant identifier of a user.

The temporal range may include the time during a call (i.e., between the start time and end time of the call) and 30 minutes before and after the call. Filtering by the temporal range may identify candidate calls in which the present time is within the temporal range of a call.

The call activities may include the connections of participants to calls. Filtering by call activities may identify candidate calls in which a number of participants have connected to the call within a predetermined period of time.

In one embodiment, identifying the call includes adding a personal conference room to the list of candidate calls. After adding the personal conference room, a connection may be established to the personal conference room. The personal conference room is another conference call that may be unique to a user of the system. The personal conference room may be generated in response to the system not finding another call for a user. In setting up the personal conference room, the system generates a service identifier for the personal conference room. The user may share the service identifier for the personal conference room with other users who may then connect to the personal conference room.

In one embodiment, the call is identified by selecting the call from a list of candidate calls using one or more of a start time for the call, a number of participants for the call, and a management identifier for the call. The selection of the call may be performed by applying a set of rules to the list of candidate calls. For example, when the list of candidate calls includes multiple calls, a rule may prioritize and select the call having a start time that is closest to the current time. As another example, a rule may prioritize and select the candidate call that has the greatest number of participants. As another example, a rule may prioritize and select the candidate call using a management identifier. The management identifier indicates that a participant in the call is a manager of the call. Priority may be given to a call in which the user is the manager of the call over a call in which the user is not the manager of the call.

At 208, a connection is established between the client device of a user and a call. The connection may be established by sending connection data to the client device of the user. The connection data may include information used by the client device, or a service provider of the user, to connect the client device of the user to a call.

In one embodiment, the connection is established by redirecting the join call request to one of a unique participant link and a public call join link. The redirection may trigger the client device of a user to access the unique participant link or trigger a service provider of the user to dial a public call join link.

The unique participant link (e.g., a URL) and the public call join link (e.g., a telephone number, which may also include a user identifier) are links that are unique to a participant. For example, each user of a conference provider may be assigned a unique participant link and public call join link. The user may distribute the links to other participants for establishing calls with other participants without the other participants joining or logging in to the system of the conference provider.

In one embodiment, the connection is established when the call is identified to which a user is to connect, and an error is returned when a call is not identified. A call may not be identified when a search of the scheduling data (of the calls of the system) indicates that there are no calls scheduled for a user at the present time.

In one embodiment, the connection is established by one of joining the call and establishing an audio connection. Joining the call may include displaying a plurality of video streams and audio streams for the call. Establishing an audio connection may include connecting a client device to an audio stream for the call without a video stream for the call.

Figure 3:
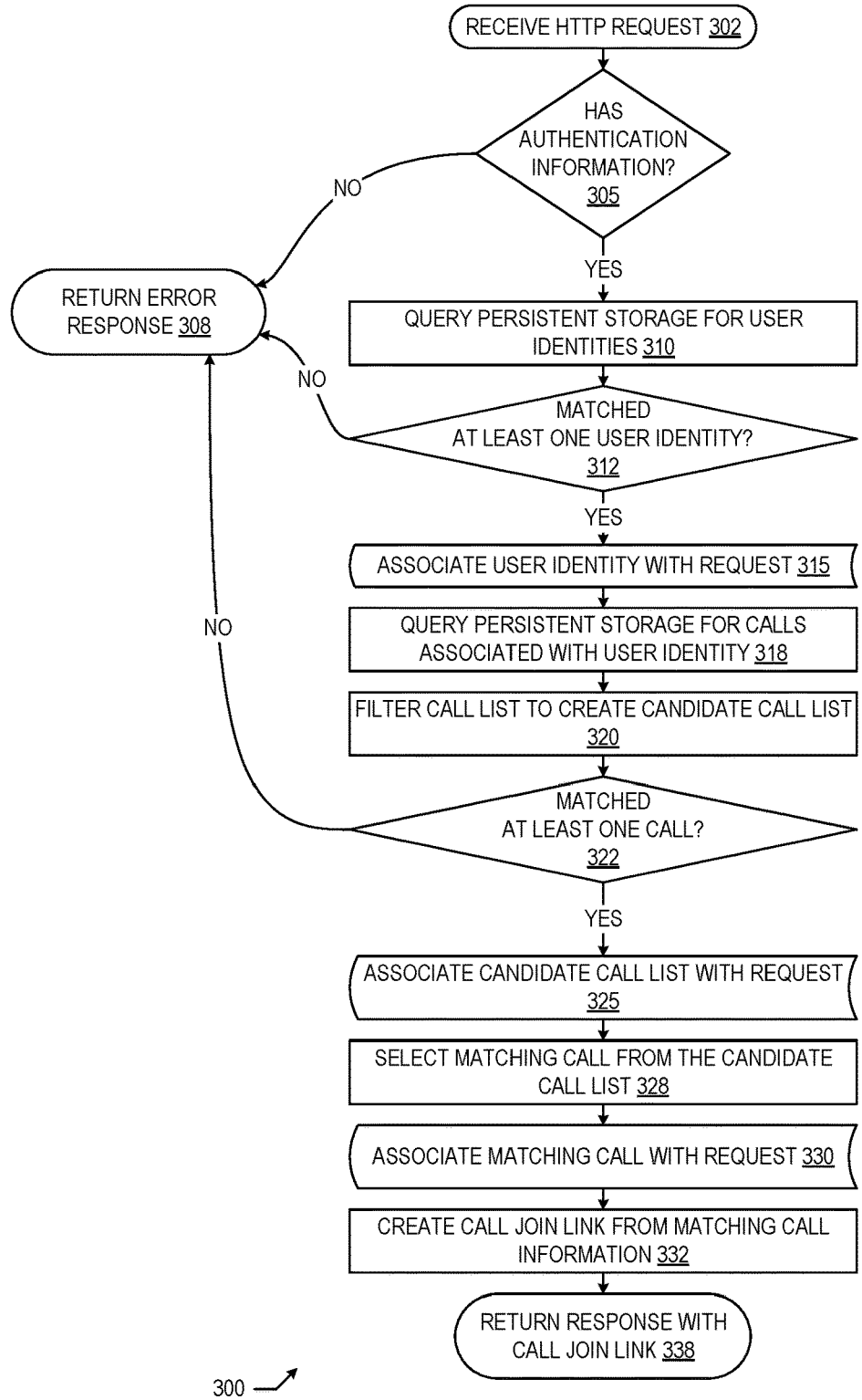
FIG. 3, FIG. 4, and FIG. 5 show examples in accordance with disclosed embodiments.
Figure 4:
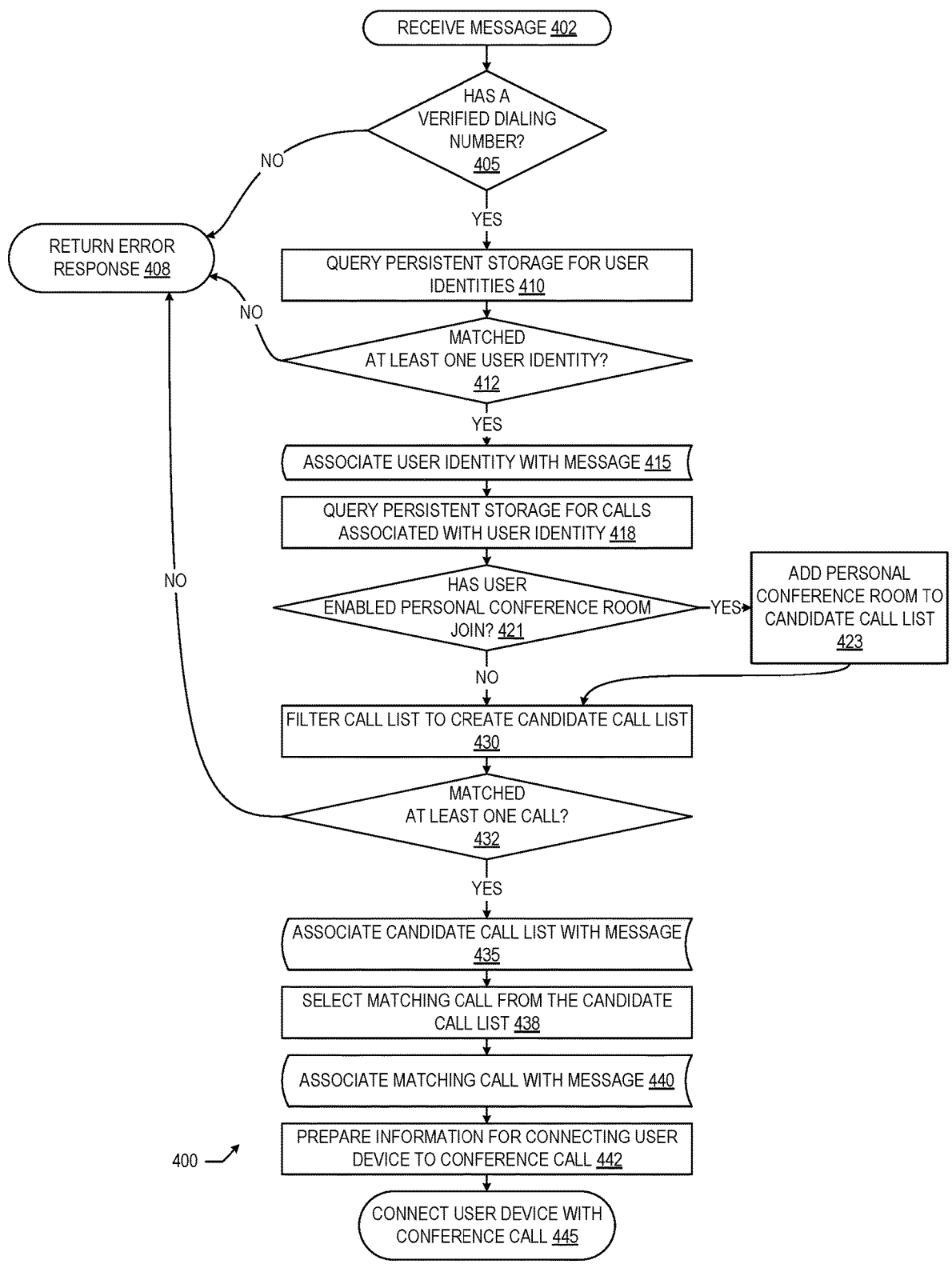
Figure 5:
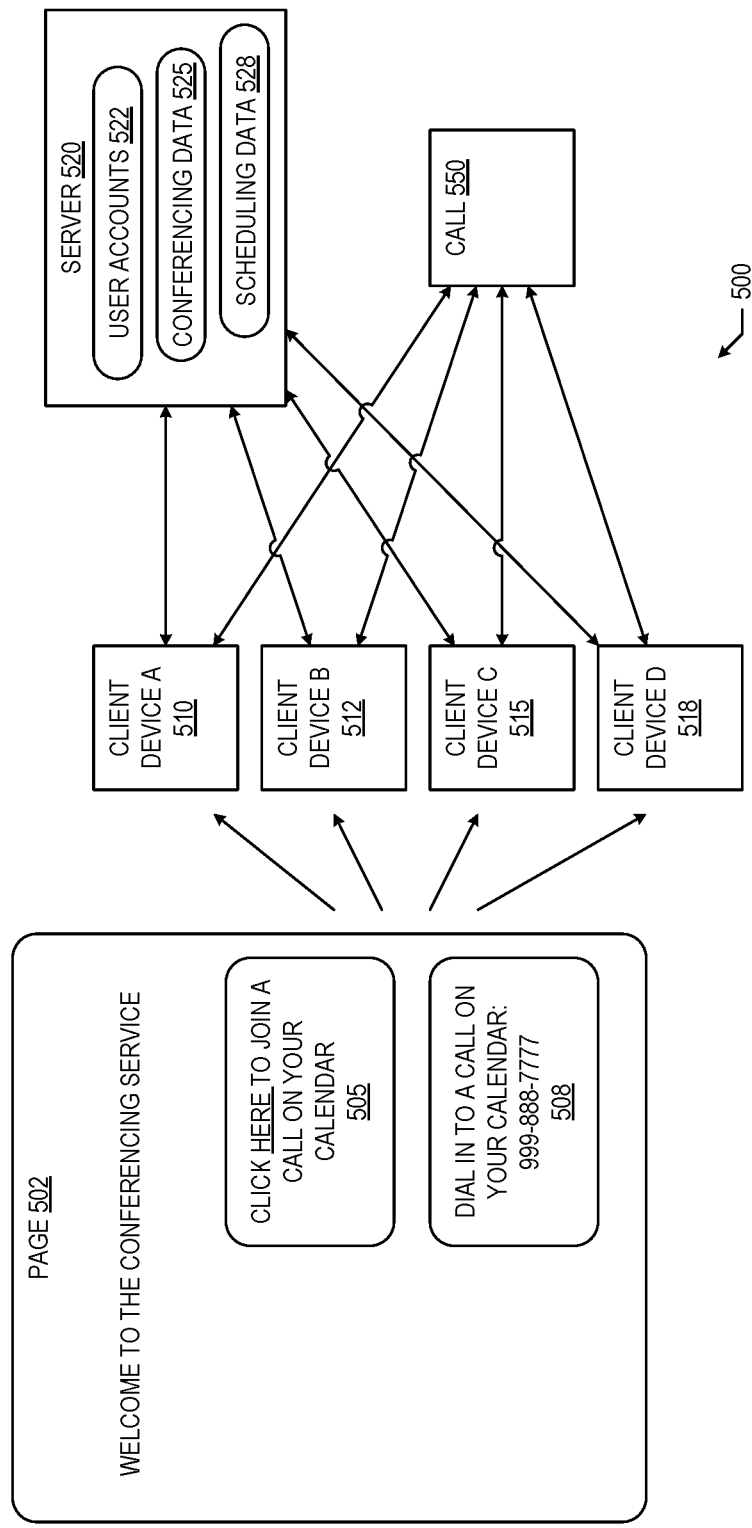

FIGS. 3, 4, and 5 show examples in accordance with the disclosure. FIG. 3 shows an example of a process for handling HTTP requests to join a call. FIG. 4 shows an example of a process for joining a call by dialing into the call. FIG. 5 shows an example of a system managing a call for multiple types of client devices and applications. The embodiments shown in FIGS. 3, 4, and 5 may be combined and may include or be included within the features and embodiments described in the other figures of the application. The features and elements of FIGS. 3, 4, and 5 are, individually and as a combination, improvements to conference call technology and computing systems. The various features, elements, widgets, components, and interfaces shown in FIGS. 3, 4, and 5 may be omitted, repeated, combined, and/or altered as shown. Accordingly, the scope of the present disclosure should not be considered limited to the specific arrangements shown in FIGS. 3, 4, and 5.

Turning to FIG. 3, the process (300) is used to join a call in response to an HTTP request. The user may intend to join a conference call scheduled for 10:00 am. The user may decide to join the call at 9:55 am by opening a web link that the user sometimes uses to join calls. The user may type in the web link into address bar of the web browser and initiate navigation.

At 302, the conferencing service server may receive an HTTP request. The HTTP request may contain a header with cookie information that includes a unique identifier associated to user identity.

Below, is an example of an HTTP request represented as JSON. The headers may contain zero or more fields that may be used to authenticate the user.

```
{
  "source_ip": "172.16.31.75",
  "headers": {
    "Cookies": "session_id= klOPGahORVeHT9s",
    "Authentication": "Bearer uaOlfs1Of0BvaF7=="
  }
}
```

At 305, the server determines whether the request includes authentication information. In one embodiment, the authentication information includes the cookie information from the header of the HTTP request. When the authentication information is found in the request, the process (300) proceeds to 310 and otherwise proceeds to 308.

At 308, an error response is returned. The error response may be generic indicating that an error occurred. In one embodiment, the error response may identify the type of error, e.g., no authentication information, no match for user identity, no call for user identity, etc.

At 310, the server may use the header contents to query the database. In response to the query, the database searches for a user identity associated with the unique identifier.

At 312, the server determines if at least one user identity matches with the authentication information. The user identity corresponds to a user account that stores information that matches the authentication information. When the authentication information matches to at least one user identity, the process (300) proceeds to 315, and otherwise proceeds to 308.

At 315, the server may associate the matched user identity with the request. In one embodiment, the association may be made by storing an identifier for the request to the user account of the user identity that matched to the request.

At 318, the server may query persistent storage for scheduled calls where at least one confirmed participant matches the user identity. The query searches the database for calls in which a user identifier listed in the call matches to the user identity associated to the request.

At 320, the call list is filtered to create a candidate call list. For example, the server may obtain three scheduled calls matching the query that form the candidate list. The first call may start at 8:00 am and scheduled to end at 9:00 am. The second call may be scheduled to start at 10:00 am. The third call may be scheduled to start at 2 pm.

At 322, the server determines if at least one call matched the request. When the candidate list includes at least one call, the process (300) proceeds to 325 and otherwise proceeds to 308.

At 325, the candidate call list is associated with the request. In one embodiment, the association may be made by storing an identifier for the candidate call list with the request.

At 328, the server selects a call from the list of candidate calls. For example, with the list of three candidate calls described above, the second call may be identified as matching to the call by having the closest starting time to the present time for the user (e.g., 9:50 am).

At 330, the server may associate the matching call to the request. In one embodiment, the association may be made by storing an identifier for the matching call to the request. Additionally, the list of candidate calls may be removed after matching one of the calls to the request.

At 332, the server may use the matching call information to produce the call join link. The server may produce a response with a location header set to the call join link. In one embodiment, the call join link may be a URL.

At 338, the call join link may be returned with a response. The response is the response to the request (from (302)). A web browser on the client device of the user may process the response and initiate navigation to the call join link. The client device may display the call as a conference call room in the browser with video streams for the other participants of the call.

Below, is an example of an HTTP response represented as JSON. The headers may contain zero or more fields, which may include a location header that contains a web link that the web browser may navigate to once the response headers are processed. The body (below) represents an optional field that may contain the HTML code that the web browser may parse and execute that may result in the web browser navigating to the page linked from the HTML code to connect to a call.

```
{
  "headers": {
    "Location": "https://example.com/call/link"
  },
  "body": "<meta http-equiv="refresh" content="0;url=https://example.com/call/link" />" (Optional)
}
```

Turning to FIG. 4, the process (400) is used to join a call in response to a message. The user may intend to join a personal conference room. The user may have previously enabled dial-in functionality to their personal conference room. The personal conference room may also be reached either by dialing in to the conference service or opening a link (e.g., a URL). In one embodiment, the user may dial the phone number on their smartphone to join the personal conference room.

At 402, the conferencing service server may receive the message. The message contains the dialing phone number and information needed for dialing phone number verification.

Below, is an example of a message for joining a call represented as JSON. Below, the caller_id field represents the dialing phone number in E.164 format, stir_identity is an optional field containing the STIR payload signed by the telephony provider of the user, and caller_id_verified represents an optional field containing a Boolean value that represents the results of the STIR payload check. The STIR payload field (stir_identity) may be omitted if STIR payload check field (caller_id_verified) is present.

```
{
  "caller_id": "+19726193000",
  "stir_identity":
"eyJhbGciOiJFUzI1NiIsInR5cCI6InBhc3Nwb3J0.__28kAwRWn__3MA4;info=<h
ttp://cert.example.net/example.cert>;alg=ES256", (Optional)
  "caller_id_verified": true (Optional)
}
```

At 405, the server may verify the dialing phone number (e.g., the number for the device of the user) is accurate, before attempting to match one or more user identities to the message. For example, numbers from blacklisted countries or area codes may be denied access to the conference service. When the dialing number is verified, the process (400) proceeds to 410 and otherwise proceeds to 408.

At 408, an error response is returned. The error response may be generic indicating that an error occurred. In one embodiment, the error response may identify the type of error, e.g., unverified dialing number, no match for user identity, no call for user identity, etc.

Below, is an example of a message for an error represented as JSON. The "actions" field (below) contains the list of commands that may be executed by the VoIP provider. For example, the command may indicate that an utterance may be spoken to the user, the VoIP provider may use text-tospeech synthesis to produce the audio that the user may hear from their device. In another example, the command may indicate that the phone call must be terminated, the VoIP provider may hang up the phone call.

```
{
    "actions": [
        "say there are no calls that you can join right now",
        "disconnect call"
    ]
}
```

At 410, the server may query the database. The query may search the database for user identities with an associated number matching to the verified dialing phone number.

At 412, a determination is made as to whether at least one user identity is matched. When at least one user identity is matched, the process (400) proceeds to 415 and otherwise proceeds to 408.

At 415, the server may identify the user identity and associate the user identity with the message. In one embodiment, the association may be made by storing an identifier for the request to the user account of the user identity that matched to the request.

At 418, the server may query the database for scheduled calls with participant user identity matching the message user identity. The query searches the database for calls in which a user identifier listed in the call matches to the user identity associated to the request.

At 421, a determination is made as to whether the user has enabled joining a personal conference room. When enabled, the process (400) proceeds to 423 and otherwise proceeds to 430.

At 423, the server may include the personal conference room of the user in the list of candidate calls. The personal conference room may be included by adding an identifier for the personal conference room to the list of candidate calls.

At 430, calls from the query are filtered to create the candidate call list. As an example, the query may return two scheduled calls. The first call may have ended two hours ago. The second call may be scheduled to start on the next day. The candidate call list further includes the personal conference room.

At 432, the server determines if at least one call matched the request. When the candidate list includes at least one call, the process (400) proceeds to 435 and otherwise proceeds to 408.

At 435, the candidate call list is associated with the message. In one embodiment, the association may be made by storing an identifier for the candidate call list with the message.

At 438, a matching call is selected from the candidate call list. The list may be ranked by a set of rules and the server may select the first item in the list of candidate calls. The rules rank calls by start time, number of participants, etc.

At 440, the server may associate the matching call to the message. In one embodiment, the association may be made by storing an identifier for the matching call to the message. Additionally, the list of candidate calls may be removed after matching one of the calls to the request.

At 442, the server may produce a response. The response may include information needed to connect the user device to audio of the personal conference room.

Below, is an example of a response message for joining a call represented as JSON. The "actions" field (below) contains the list of commands that may be executed by the VoIP provider. For example, the command may indicate that the phone call may be connected to a conference room, the VoIP provider may connect the phone call to the audio of the conference room, the user may be able to hear other participants in the conference room through the user device, and other participants may be able to hear the user.

```
{
    "actions": [
        "connect to conference room with ID = T1j9dmyv2"
    ]
}
```

At 445, the user device may get connected to the personal conference room. For example, the telephone service provider of the user may connect to the personal conference room by initiating a call to the telephone number for the personal conference room. The user may hear and may be able to speak with other participants that may join the same conference room or may have already joined the same conference room.

Turning to FIG. 5 the system (500) is used by multiple users to join the call (550). The users operate the client devices A (510), B (512), C (515), and D (518) and respond to the page (502) to interact with the server (520) and connect to the call (550).

The page (502) may be displayed on the client devices A (510) through D (518). The page (502) includes the buttons (505) and (508). Selection of the button (505) may initiate a request to join a video conference (i.e., the call (550)). Selection of the button (508) may trigger a client device to open a dialer application that dials the number identified in the button (508). The user may manually open the dialer application and manually dial the number from the button (508).

The client devices A (510), B (512), C (515), and D (518) initially contact the server (520). The client devices A (510), B (512), C (515), and D (518) may be different and types of devices that use different types of applications to connect to the server (520) and the call (550). In one embodiment, the client device A (510) is a VOIP client, the client device B (512) is a PSTN device, the client device C (515) is a computing system with a browser application, and the client device D (518) is a smart phone with a native application. Each of the client devices A (510) through D (518) connect to a service provide (telephone service provider, internet service provider, etc.) and a message or request is sent to the server.

The server (520) manages the connection of the client devices A (510) through D (518) to the call (550) using the user accounts (522), the conferencing data (525), and the scheduling data (528). The user accounts (522) include information that identifies the identities of the users of the client devices A (510) through D (518). The conferencing data (525) includes the connection data for the call (550). The scheduling data (528) includes the times and participants for the calls managed with the server (520).

The server (520) receives the messages and requests from the client devices A (510) through D (518). The messages and requests are verified along with the users of the devices based on the information in the user accounts (522) matching to the verification information in the messages and requests from the client devices A (510) through D (518). After verifying a user, the server (520) identifies the call (550) as the call matching to the user using the scheduling data (528) (to check start times) and the conferencing data (525) (to check the number of current participants for the call (550)). The server (520) generates connection data that is then used to connect the client devices A (510) through D (518) to the call (550).

The call (550) is a video conference with video and audio streams for the participants of the call (550). The call (550) is tolerant of many types of devices and applications being used to connect, as discussed above.

Embodiments of the disclosure may be implemented on a computing system. Any combination of a mobile, a desktop, a server, a router, a switch, an embedded device, or other types of hardware may be used. For example, as shown in FIG. 6A, the computing system (600) may include one or more computer processor(s) (602), non-persistent storage (604) (e.g., volatile memory, such as a random access memory (RAM), cache memory), persistent storage (606) (e.g., a hard disk, an optical drive such as a compact disk (CD) drive or a digital versatile disk (DVD) drive, a flash memory, etc.), a communication interface (612) (e.g., Bluetooth interface, infrared interface, network interface, optical interface, etc.), and numerous other elements and functionalities.

The computer processor(s) (602) may be an integrated circuit for processing instructions. For example, the computer processor(s) (602) may be one or more cores or micro-cores of a processor. The computing system (600) may also include one or more input device(s) (610), such as a touchscreen, a keyboard, a mouse, a microphone, a touchpad, an electronic pen, or any other type of input device.

The communication interface (612) may include an integrated circuit for connecting the computing system (600) to a network (not shown) (e.g., a local area network (LAN), a wide area network (WAN) such as the Internet, a mobile network, or any other type of network) and/or to another device, such as another computing device.

Further, the computing system (600) may include one or more output device(s) (608), such as a screen (e.g., a liquid crystal display (LCD), a plasma display, a touchscreen, a cathode ray tube (CRT) monitor, a projector, or other display device), a printer, an external storage, or any other output device. One or more of the output device(s) (608) may be the same or different from the input device(s) (610). The input and output device(s) (610 and (608)) may be locally or remotely connected to the computer processor(s) (602), non-persistent storage (604), and persistent storage (606). Many different types of computing systems exist, and the aforementioned input and output device(s) (610 and (608)) may take other forms.

Software instructions in the form of computer readable program code to perform embodiments of the disclosure may be stored, in whole or in part, temporarily or permanently, on a non-transitory computer readable medium such as a CD, a DVD, a storage device, a diskette, a tape, flash memory, physical memory, or any other computer readable storage medium. Specifically, the software instructions may correspond to computer readable program code that, when executed by a processor(s), is configured to perform one or more embodiments of the disclosure.

The computing system (600) in FIG. 6A may be connected to or be a part of a network. For example, as shown in FIG. 6B, the network (620) may include multiple nodes (e.g., node X (622), node Y (624)). Each node may correspond to a computing system, such as the computing system (600) shown in FIG. 6A, or a group of nodes combined may correspond to the computing system (600) shown in FIG. 6A. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system (600) may be located at a remote location and connected to the other elements over a network.

Figure 6B:
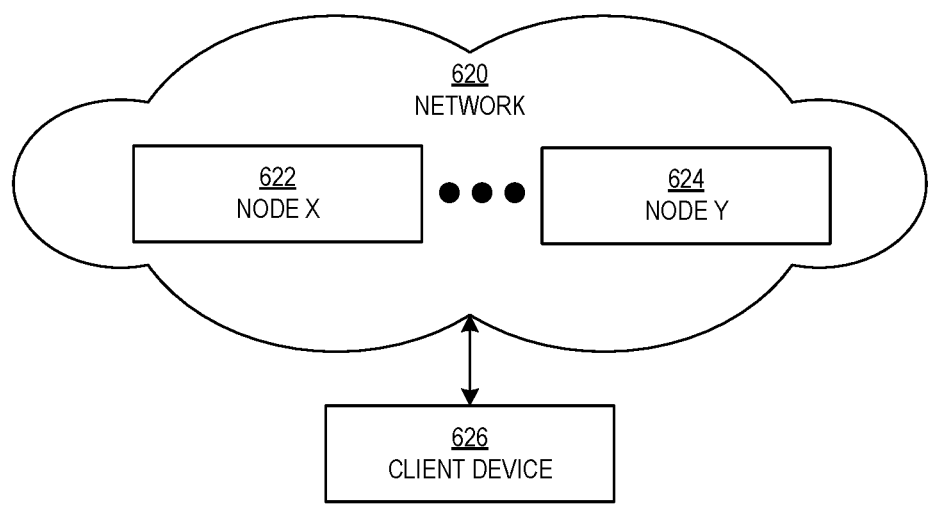

Although not shown in FIG. 6B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (622), node Y (624)) in the network (620) may be configured to provide services for a client device (626). For example, the nodes may be part of a cloud computing system. The nodes may include functionality to receive requests from the client device (626) and transmit responses to the client device (626). The client device (626) may be a computing system, such as the computing system (600) shown in FIG. 6A. Further, the client device (626) may include and/or perform all or a portion of one or more embodiments of the disclosure.

The computing system (600) or group of computing systems described in FIGS. 6A and 6B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data sharing techniques described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system (600) in FIG. 6A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system (600) of FIG. 6A, while performing one or more embodiments of the disclosure, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the disclosure, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system (600) in FIG. 6A may implement and/or be connected to a data repository. For example, one type of data repository is a database. A database is a collection of information configured for ease of data retrieval, modification, re-organization, and deletion. A Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g., join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system (600) of FIG. 6A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system (600) of FIG. 6A and the nodes (e.g., node X (622), node Y (624)) and/or client device (626) in FIG. 6B. Other functions may be performed using one or more embodiments of the disclosure.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A method comprising:
    receiving, from a client device, a message for a join call request from a link to join a call of a plurality of calls, wherein the message comprises a participant identifier, wherein the participant identifier comprises one or more of a token when the join call request is from the link, Secure Telephony Identity Revisited (STIR) data when the join call request is from a voice over internet protocol (VOIP) call, and Signature-based Handling of Asserted information using toKENs (SHAKEN) data when the join call request is from a public switched telephone network (PSTN) call, and wherein the link is accessible by a plurality of users to access the plurality of calls comprising the call;
    verifying the participant identifier, wherein the participant identifier comprises one or more of a cookie and a JavaScript web token;
    determining a list of candidate calls associated with the link;
    determining that a personal conference room is enabled for one or more of the client device and the participant identifier and, in response, adding the personal conference room to the list of candidate calls;
    identifying the call corresponding to the participant identifier from the list of candidate calls; and
    establishing a connection between the client device and the call.

2. The method of claim 1, further comprising:
    receiving the message in response to selection of a service identifier by the client device, wherein the service identifier is used by the plurality of users for a plurality of calls, wherein the plurality of calls comprises the call.

3. The method of claim 1, further comprising:
    receiving the message responsive to the client device dialing a public phone number.

4. The method of claim 1, further comprising:
    receiving the message responsive to the client device opening a public web link.

5. The method of claim 1, further comprising:
    establishing the connection by redirecting the join call request to one of a unique participant link and a public call join link.

6. The method of claim 1, further comprising:
    sending an alternative verification message to the client device after an initial verification attempt fails; and
    receiving the message after an alternative verification corresponding to the alternative verification message is completed.

7. The method of claim 1, wherein the participant identifier is from an authentication header comprising one or more of the cookie and the JavaScript web token.

8. The method of claim 1, further comprising:
    receiving the message from a service provider.

9. The method of claim 1, further comprising:
    storing a user identifier to a user account; and
    verifying the participant identifier with the user identifier.

10. The method of claim 1, further comprising:
    identifying the call by filtering a plurality of calls, comprising the call, to form the list of candidate calls, comprising the call, using one or more of the participant identifier, a temporal range, and a plurality of call activities of the plurality of calls.

11. The method of claim 1, further comprising:
establishing the connection using the personal conference room.

12. The method of claim 1, further comprising:
identifying the call by selecting the call from the list of candidate calls using one or more of a start time for the call, a number of participants for the call, and a management identifier for the call.

13. The method of claim 1, further comprising:
establishing the connection when the call is identified; and returning an error when the call is not identified.

14. The method of claim 1, further comprising:
establishing the connection by one of joining the call and establishing an audio connection.

15. A system comprising:
a verification controller configured to verify a participant identifier;
an identification controller configured to identify a call;
a server application executing on one or more servers and configured for:
  receiving, from a client device, a message for a join call request from a link to join the call of a plurality of calls, wherein the message comprises the participant identifier, wherein the participant identifier comprises one or more of a token when the join call request is from the link, Secure Telephony Identity Revisited (STIR) data when the join call request is from a voice over internet protocol (VOIP) call, and Signature-based Handling of Asserted information using toKENS (SHAKEN) data when the join call request is from a public switched telephone network (PSTN) call, and wherein the link is accessible by a plurality of users to access the plurality of calls comprising the call;
  verifying, with the verification controller, the participant identifier, wherein the participant identifier comprises one or more of a cookie and a JavaScript web token, and wherein the join call request is from the link;
  determining a list of candidate calls associated with the link;
  determining that a personal conference room is enabled for one or more of the client device and the participant identifier and, in response, adding the personal conference room to the list of candidate calls;
  identifying, with the identification controller, the call corresponding to the participant identifier from the list of candidate calls; and
  establishing a connection between the client device and the call.

16. The system of claim 15, further comprising:
receiving the message in response to selection of a service identifier by the client device, wherein the service identifier is used by the plurality of users for a plurality of calls, wherein the plurality of calls comprises the call.

17. The system of claim 15, further comprising:
receiving the message responsive to the client device dialing a public phone number.

18. The system of claim 15, further comprising:
receiving the message responsive to the client device opening a public web link.

19. The system of claim 15, further comprising:
establishing the connection by redirecting the join call request to one of a unique participant link and a public call join link.

20. A method comprising:
interacting, by a client application, with a server application to join a call, wherein the server is configured for:
  receiving, from a client device, a message for a join call request from a link to join the call of a plurality of calls, wherein the message comprises a participant identifier, wherein the participant identifier comprises one or more of a token when the join call request is from the link, Secure Telephony Identity Revisited (STIR) data when the join call request is from a voice over internet protocol (VOIP) call, and Signature-based Handling of Asserted information using toKENS (SHAKEN) data when the join call request is from a public switched telephone network (PSTN) call, and wherein the link is accessible by a plurality of users to access the plurality of calls comprising the call;
  verifying the participant identifier, wherein the participant identifier comprises one or more of a cookie and a JavaScript web token, and wherein the join call request is from the link;
  determining a list of candidate calls associated with the link;
  determining that a personal conference room is enabled for one or more of the client device and the participant identifier and, in response, adding the personal conference room to the list of candidate calls;
  identifying the call corresponding to the participant identifier from the list of candidate calls; and
establishing a connection to the call.

* * * * *